United States Patent
Ammann

(10) Patent No.: US 9,778,088 B2
(45) Date of Patent: Oct. 3, 2017

(54) SENSOR DEVICE FOR DETECTING A LIQUID AND METHOD THEREFOR

(71) Applicant: RHYTON GmbH, Lucerne (CH)

(72) Inventor: Hans Ulrich Ammann, Langenthal (CH)

(73) Assignee: RHYTON GMBH, Langenthal (CH)

( * ) Notice: Subject to any disclaimer, the term of this patent is extended or adjusted under 35 U.S.C. 154(b) by 503 days.

(21) Appl. No.: 14/266,898

(22) Filed: May 1, 2014

(65) Prior Publication Data

US 2014/0331762 A1 Nov. 13, 2014

(30) Foreign Application Priority Data

May 8, 2013 (EP) .................................... 13167030

(51) Int. Cl.
*G01G 23/18* (2006.01)
*G01F 23/18* (2006.01)
*G01F 23/16* (2006.01)

(52) U.S. Cl.
CPC ............ *G01F 23/18* (2013.01); *G01F 23/165* (2013.01); *G01F 23/168* (2013.01); *G01F 23/185* (2013.01)

(58) Field of Classification Search
CPC ...... G01F 23/185; G01F 23/18; G01F 23/168; G01F 23/165
USPC .............................. 73/290 V, 290 R, 291, 299
See application file for complete search history.

(56) References Cited

U.S. PATENT DOCUMENTS

| | | | | |
|---|---|---|---|---|
| 2,707,393 A | * | 5/1955 | Hardway, Jr. | ............. G01F 1/72 73/861.48 |
| 4,205,708 A | * | 6/1980 | Burgbacher | ............. F16N 7/32 139/1 R |
| 5,568,882 A | | 10/1996 | Takacs | |
| 5,953,954 A | | 9/1999 | Drain et al. | |
| 6,931,926 B1 | | 8/2005 | Van Ee | |
| 2011/0296906 A1 | * | 12/2011 | Laermer | ............. H01L 41/1134 73/146 |

FOREIGN PATENT DOCUMENTS

EP 1 356 724 10/2003

OTHER PUBLICATIONS

European Search Report dated Oct. 1, 2013, corresponding to the Foreign Priority Application No. 13 16 7030.

* cited by examiner

*Primary Examiner* — Daniel S Larkin
*Assistant Examiner* — Alex Devito
(74) *Attorney, Agent, or Firm* — Young & Thompson

(57) ABSTRACT

The sensor device serves for detecting the absence or presence of a liquid (1) at the outlet (10a) of a feed line (10) through which there can be fed a feed substance which, when exiting from the outlet, has a pressure (p) in the feed line which has a course over time with a first characteristic in the absence of the liquid and has a course over time with a second characteristic in the presence of the liquid. The sensor device includes a sensing instrument (20-23) for sensing the pressure fluctuations in the feed line (10) and evaluator (30) which is designed to assign the sensed pressure fluctuations to the first or second characteristic and to generate a corresponding signal which indicates whether the liquid (1) is absent or present at the feed line outlet (10a).

16 Claims, 2 Drawing Sheets

US 9,778,088 B2

SENSOR DEVICE FOR DETECTING A LIQUID AND METHOD THEREFOR

FIELD OF THE INVENTION

The invention relates to a sensor device for detecting a liquid and to a method therefor.

BACKGROUND OF THE INVENTION

Such sensor devices and methods are used for example to monitor and/or to control liquid levels.

Sensor devices are known, for example, which are designed as pivotably mounted floats and comprise a movable solid body. If the liquid, as it rises, reaches the level of the float, the latter is pivoted so that the solid body is displaced and actuates a switch. Such floats have the disadvantage that they come into contact with the liquid and under some circumstances become so soiled that they no longer function reliably.

Pneumatically acting sensor devices are also known, cf. for example U.S. Pat. No. 5,953,954. In this case, a feed line having an outlet is provided, via which compressed air can be fed as a feed substance. The outlet of the feed line is located in the liquid in order to sense the level thereof. The higher the liquid reaches above the outlet, the higher the hydrostatic pressure at the outlet and thus the higher the counterpressure acting on the air in the feed line. By sensing the pressure in the feed line, it is ultimately possible to draw a conclusion about the level of the liquid. This measurement principle has the disadvantage that it is relatively slow and a specific, predefined level of the liquid cannot be precisely sensed. It is also disadvantageous that, when a switch, for example a membrane switch, which switches at a specific pressure and thus at a specific level is installed in the feed line, usually an overpressure valve has to be provided in order to protect the switch against an overpressure. This may occur, for example, if the outlet of the feed line is blocked and thus the feed substance in the form of the compressed air is unable to flow away.

SUMMARY OF THE INVENTION

It is an object of the invention to specify a sensor device and a method by which a specific level of a liquid can be sensed more precisely.

According to a first aspect of the invention this object is achieved with a sensor device for detecting an absence or presence of a liquid at an outlet of a feed line, which serves for feeding a feed substance. The feed substance, when exiting from the outlet, has a pressure in the feed line, which has a course over time with a first characteristic when liquid is absent at the outlet and a course over time with a second characteristic when liquid is present at the outlet. The sensor device comprises a sensing instrument for sensing pressure fluctuations in the feed line and an evaluator, which is designed to assign the sensed pressure fluctuations to the first or second characteristic and to generate a corresponding signal, which indicates whether the liquid is absent or present at the feed line outlet.

According to a second aspect of the invention there is provided a method comprising the steps of:
feeding a feed substance to the outlet in such a way that a course over time of a pressure of the feed substance in the feed line has a first characteristic when liquid is absent at the outlet and has a second characteristic when liquid is present at the outlet;
sensing and evaluating pressure fluctuations in the feed line, wherein said pressure fluctuations are assigned to the first or second characteristic; and
generating a corresponding signal, which indicates whether the liquid is absent or present at the feed line outlet.

The invention is based on the finding that the flow behavior of the feed substance depends on whether liquid is or is not present at the outlet of the feed line. Correspondingly, the pressure fluctuations of the feed substance in the feed line have a different characteristic over time. By way of example, the pressure fluctuations may change between a curve which varies over time and a curve which remains substantially constant. By sensing the pressure fluctuations, it is possible to draw a conclusion about the corresponding characteristic and thus the state in which the liquid is not present at the outlet can be distinguished from the state in which the liquid is present at the outlet. In contrast to the known pneumatically acting sensor devices, in which a static parameter in the form of the hydrostatic pressure is evaluated, here a dynamic parameter in the form of the pressure fluctuations is used for the measurement. This can be carried out in a precise manner and is relatively easy to implement in measurement terms.

BRIEF DESCRIPTION OF THE DRAWINGS

Further specific design features and the advantages thereof are clear from the following description and drawings of an example of embodiment, in which.

DETAILED DESCRIPTION OF THE PREFERRED EMBODIMENTS

Figure 1:
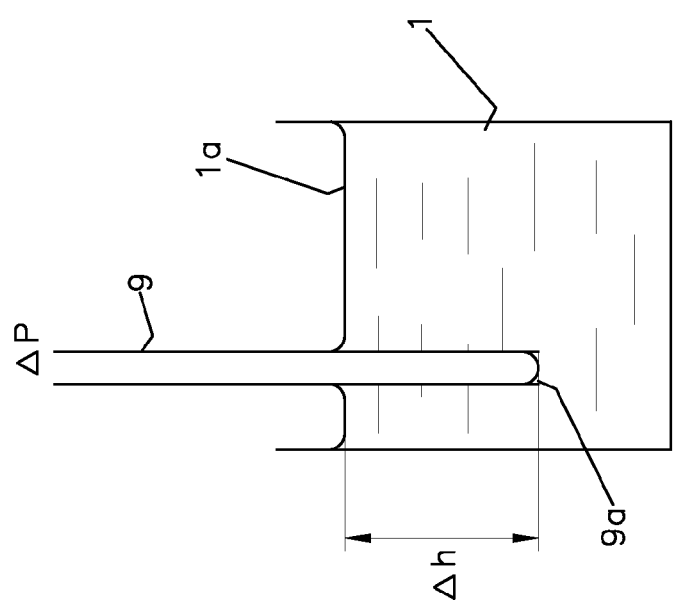
FIG. 1 shows a known arrangement for determining the liquid level via the hydrostatic pressure.

FIG. 1 illustrates the known measurement principle, in which compressed air is fed to the outlet 9a via a pipe 9. If the level 1a of the liquid 1 is located above the outlet 9a, then the liquid column Δh located thereabove causes the pressure to increase by ΔP in the pipe 9. By measuring ΔP, it is possible to tell whether the outlet 9a is or is not located in the liquid 1. One disadvantage with this is that a reliable measurement is possible only from a particular immersion depth Δh of the pipe 9. Furthermore, the level 1a of the liquid 1 cannot be sensed precisely, which stems inter alia from the fact that the bubbles which form when the compressed air is introduced into the liquid 1 lead to a fluctuation of ΔP, which is a static parameter.

Figure 3:
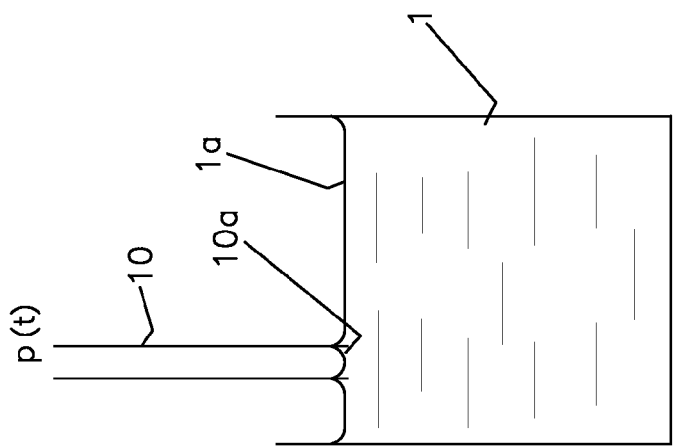
FIG. 3 shows the arrangement according to FIG. 2 with an outlet wetted by the liquid.
Figure 2:
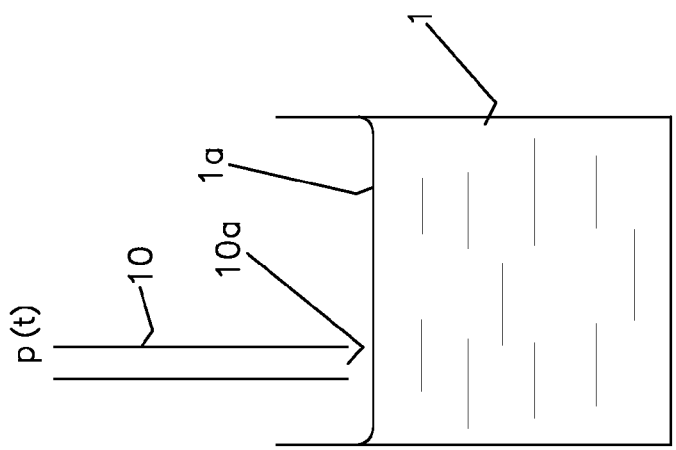
FIG. 2 shows an arrangement according to the invention with an open outlet.

The new measurement principle, as illustrated in FIGS. 2 and 3 and explained in more detail below, is based on evaluating a dynamic, i.e. non-static, parameter. To this end, a feed substance is fed to the outlet 10a via a feed line 10 and the fluctuations over time of the pressure p(t) of the feed substance in the feed line 10 are sensed and evaluated.

If the level 1a of the liquid 1, as shown in FIG. 2, is located below the outlet 10a, then the latter is open (hereinafter referred to as the "open state"). The pressure fluctuations p(t) then have over time a first characteristic curve. As soon as the liquid 1 wets the outlet 10*a*, as shown in FIG. 3, the latter is closed ("closed state"). The flow conditions of the feed substance then change, so that the pressure fluctuations p(t) have a second characteristic curve which differs from the first.

The respective curve depends inter alia on the type of feed substance used and on the configuration of the feed line 10 and of the outlet 10*a*.

Figure 5:
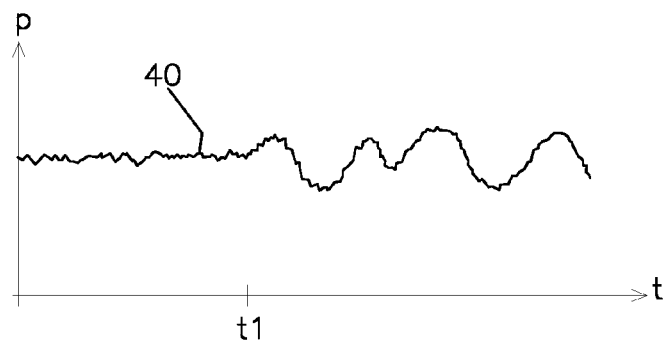
FIG. 5 shows by way of example the curve of the measured values over time.

If, for example, compressed air is fed through the feed line 10, then said compressed air flows uniformly out of the outlet 10*a* in the open state shown in FIG. 2. The pressure p(t) therefore does not markedly change. In the closed state shown in FIG. 3, on the other hand, the compressed air is fed in the form of bubbles into the liquid 1. The pressure p(t) will therefore increase and decrease repeatedly. The two different curves are shown in FIG. 5, wherein the instant t1 corresponds to the transition from the open to the closed state.

It is also conceivable to produce a reverse characteristic of p(t), i.e. fluctuating over time in the open state and substantially constant in the closed state. This can be achieved for example by using a liquid feed substance and by configuring the outlet 10*a* as an aerator for sucking in air. In the open state, air is then constantly sucked in through the outlet 10*a* and is mixed with the liquid feed substance, so that the pressure p(t) discernibly fluctuates over time. If, however, the outlet 10*a* is located so far into the liquid 1 that it is no longer possible for air to be sucked in, then the liquid feed substance flows out uniformly. The pressure p(t) then barely changes over time.

It is also possible to configure the outlet 10*a* such that a liquid feed substance exits therefrom in the form of two intersecting jets. In the open state, said jets break into droplets at the point of intersection, resulting in increasing and decreasing pressure fluctuations p(t) over time. In the closed state, on the other hand, the jets exiting into the liquid do not interact with one another, so that the pressure p(t) remains substantially constant.

In general, by analyzing the measured pressure fluctuations p(t), for example with regard to frequency and/or amplitude, it is possible to distinguish whether the current state is the open or closed state.

Depending on the intended use, the feed substance need not flow constantly out of the outlet 10*a*. For instance, it is conceivable to allow the feed substance to flow out and to evaluate the temporal course of the pressure only during certain time intervals, while in the time intervals therebetween the feeding of the feed substance is interrupted and no measurement is carried out. As a result of this repeated switching-on and switching-off of the feed, less feed substance is required for the measurement.

There will be explained below with reference to FIG. 4 one example of embodiment of a sensor device, by means of which it is possible to detect whether a liquid 1 is absent or—as shown here—present at the outlet 10*a* of the feed line 10. As indicated by the arrow 2, the feed substance, which depending on the intended use of the sensor device and the type of liquid 1 may be in gas form, for example in the form of compressed air or another gas such as nitrogen, or in liquid form, can be fed into the inlet 10*b* of the feed line 10.

Figure 4:
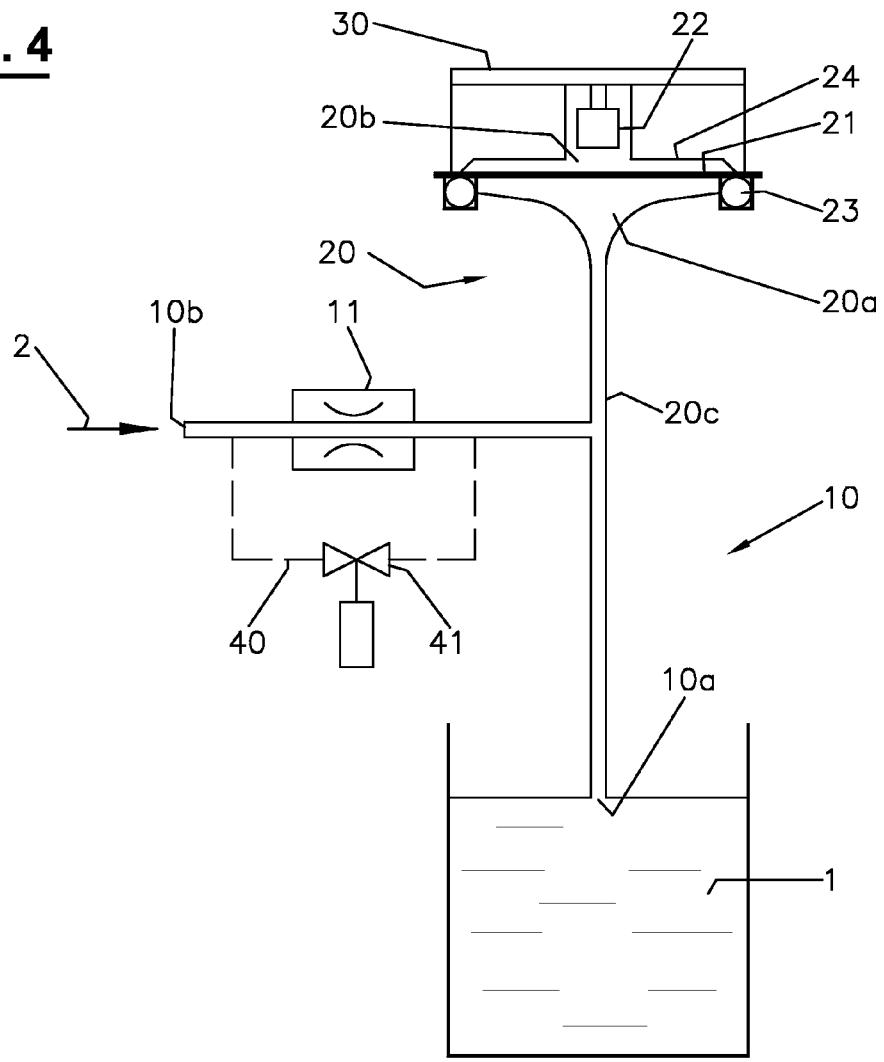
FIG. 4 shows a schematic view of one example of embodiment of a sensor device.

For the measurement in the example shown in FIG. 4, the type of feed substance and the pressure thereof at the outlet 10*a* are selected such that said feed substance, when being fed out of the outlet and into the liquid 1, does not flow in continuously but rather enters the liquid 1 in an interrupted manner as a result of the fact that closed structures composed of feed substance form repeatedly over time at the feed line outlet 10*a* and are discharged into the liquid 1. Depending on the type of feed substance, these structures are droplets, bubbles or the like.

Supply means are provided, by means of which the feed substance is fed through the feed line 10 with a substantially constant throughflow (for example specified in volume per unit time). The supply means contain, for example, a flow regulator. In the example shown in FIG. 4, which is designed for using compressed air or another gas as the feed substance, a throttle 11 is provided in order to reduce the throughflow.

If the feed line outlet 10*a* is located outside the liquid 1, then the feed substance flows continuously out of the feed line outlet 10*a*. The pressure p of the feed substance in the feed line 10 does not substantially change in this case ("open state").

If, on the other hand, liquid 1 is present at the feed line outlet 10*a*, then the feed substance is fed in portion by portion and thus in an interrupted manner. This means that the pressure p of the feed substance in the feed line 10 changes over time ("closed state").

In the closed state, the feed substance is generally not discharged regularly into the liquid 1 in time terms, but rather the time intervals between the individual discharge events vary. However, these time intervals lie in a typical range with regard to amplitude and frequency, so that the closed state can be distinguished from the open state for example by averaging over a number of instants.

In order to sense the pressure fluctuations in the feed line 10, the sensor device has suitable sensing means serving as a sensing instrument. In the example shown in FIG. 4, the sensor device comprises a measurement chamber 20 which is subdivided by a separating element 21 into a front chamber 20*a* and a rear chamber 20*b*. The front chamber 20*a*, which is designed here in the shape of a funnel, is connected via an inlet 20*c* to the feed line 10 in order to ensure a transmission of vibrations. A sensor 22 is arranged in the rear chamber 20*b*. The separating element 21 is designed such that pressure fluctuations in the feed line 10 lead to vibrations of the separating element 21, which can be sensed by the sensor 22. The separating element 21 thus serves as a vibrating element and to this end is designed to be elastic, for example in the form of a membrane. A suitable sensor 22 is for example a microphone, by means of which the sound waves generated by the vibrating separating element 21 can be picked up. It is also conceivable to use a piezoelectric or piezoresistive element as the sensor 22 for sensing the vibrations of the separating element 21.

The sensor device here has sealing means 23, for example an O-ring, for sealing off the separating element 21. This prevents liquid 1 and/or vapors from being able to pass, for example by back-diffusion, from the feed line 10 into the rear chamber 20*b* of the measurement chamber 20, where the sensor 22 is located.

The sensor device furthermore has a stop 24 which defines the maximum possible deflection of the separating element 21. As a result, the sensor 22 can be protected against an overpressure which may build up for example if the feed line outlet 10*a* is blocked and therefore the feed substance that has been fed in cannot flow away. The sensor device can thus be operated without any overpressure valves, which are usually used to protect the sensor against overpressure.

The sensor device further contains evaluation means (evaluator) for evaluating the sensed pressure fluctuations and for generating signals which indicate whether the liquid 1 is absent or present at the feed line outlet 10a. The evaluation means typically comprise an electronic circuit 30 which can be fed with the signals generated by the sensor 22 in order to evaluate said signals and generate output signals. The circuit 30 can be constructed on an analog or digital basis and is arranged for example on a printed circuit board.

The circuit 30 is preferably designed such that the measured values supplied by the sensor 22 are averaged over time.

The circuit 30 further comprises means for conditioning the measurement signals. By way of example, the circuit 30 has filter means for filtering out interference signals which may be caused by noise, external vibrations, etc. The pressure fluctuations to be sensed typically lie in the range of a few tens of Hertz, typically 25-30 Hertz, while the interference signals generally have higher frequencies. By providing a low-pass filter, the effects of such sources of interference can be filtered out.

The evaluation means of the sensor device may be designed such that they deliver a binary signal as the output signal and thus the sensor device can be used as a level switch.

It is also conceivable to provide the circuit 30 with a processor in order to further evaluate the signals delivered by the sensor 22 and thus obtain measured values for certain properties of the liquid, for example the viscosity, surface tension, etc. thereof.

Optionally, as indicated in dashed line in FIG. 4, the feed line 10 has a bypass at 40 for conveying feed substance at the higher pressure—as supplied—to the feed line outlet 10a. The opening and closing of the bypass 40 takes place by means of a switchable valve 41. The provision of the bypass 40 makes it possible, by briefly opening and closing the valve 41, to feed the feed substance at increased pressure in a pulsed manner through the feed line 10 and in particular the feed line outlet 10a. The circuit 30 may be designed such that this flushing-through of the feed line 10 takes place repeatedly. It is also possible to design the circuit 30 such that the increase in pressure caused by the pulsed flow of the feed substance can be sensed by the sensor device. As a result, the latter can be tested during operation for any faults. Here, too, the circuit 30 may be designed such that this test measurement is carried out repeatedly.

Figure 6:
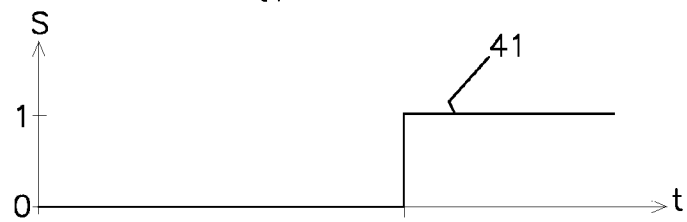
FIG. 6 shows the output signal generated on the basis of these measured values.

FIGS. 5 and 6 show by way of example the curve 40 over time of the pressure p which is sensed by the sensor device, and the curve 41 over time of the output signal S. In the example here, up until the instant t1, the liquid 1 is not present at the feed line outlet 10a, so that the pressure p does not significantly change (open state). From the instant t1 onward, liquid 1 is located at the feed line outlet 10a, so that the pressure p repeatedly increases and decreases (closed state). The output signal S, which in this case is a binary signal, is at "zero" in the open state and changes to "one" at the instant t2 and thus indicates the closed state. The change takes place with a slight time delay, i.e. t2>t1.

The sensor device is versatile and can be used for example as a level switch, by means of which it is possible to sense whether a liquid has reached a specific level. To this end, the feed line outlet 10a is arranged at the level to be sensed. If the liquid level reaches this level during operation, the sensor device generates a corresponding output signal S.

Such a level switch can be used for example in a filter device for cleaning soiled liquid. To this end, the filter device has a filter trough with a filter, into which the liquid to be cleaned is fed. Over time, the filter will become blocked, so that too little liquid passes through the filter and the liquid level rises until it reaches the predetermined level and switches the level switch. The control of the filter device is set up in such a way that the filter is then moved forward in order to transport an unused portion of the filter into the filter trough.

It is also possible to provide the sensor device with two or more feed line outlets 10a which may be arranged at different levels in order thus to sense more than one level of the liquid 1. Sensing means 20-23 in the manner of FIG. 4 are then provided for each feed line outlet 10a.

From the above description, numerous modifications are available to a person skilled in the art without departing from the scope of protection of the invention, which is defined by the claims.

For instance, instead of a bypass 40 as shown in FIG. 4, an inlet separate from the inlet 10b may also be provided which opens into the feed line 10 and into which feed substance can be introduced at increased pressure. The feed substance may in this case come from a different source. If, for example, compressed air is used as the feed substance, then it is conceivable to use the exhaust air from the pneumatic system to introduce it when required through the separate inlet into the feed line 10 and thus to flush through the feed line 10 and the outlet 10a.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A sensor device for detecting an absence or presence of a liquid at an outlet of a feed line, which serves for feeding a feed substance, the feed substance, when exiting from the outlet, having a pressure in the feed line, said pressure having a course over time with a first characteristic when liquid is absent at the outlet, and a course over time with a second characteristic when liquid is present at the outlet, the sensor device comprising:
   a sensing instrument configured to sense pressure fluctuations in the feed line; and
   an evaluator configured to determine whether the sensed pressure fluctuations correspond to one of the first characteristic or the second characteristic, and to generate a signal corresponding to the determination, the signal indicating whether the liquid is absent or present at the feed line outlet,
   wherein the first and second characteristics are different from each other, and at least one of the first and second characteristics is one wherein the pressure in the feed line changes within a time interval in which a level of the liquid remains unchanged.

2. The sensor device according to claim 1, wherein the evaluator is configured to determine at least one of an amplitude and a frequency of the sensed pressure fluctuations.

3. The sensor device according to claim 1, wherein the sensing instrument comprises at least one of the following elements as a sensor: a microphone, a piezoelectric element, a piezoresistive element.

4. A sensor device for detecting an absence or presence of a liquid at an outlet of a feed line, which serves for feeding a feed substance, the feed substance, when exiting from the outlet, having a pressure in the feed line, said pressure having a course over time with a first characteristic when liquid is absent at the outlet and a course over time with a second characteristic when liquid is present at the outlet, the sensor device comprising:
- a vibrating element configured to vibrate responsive to pressure fluctuations in the feed line;
- a sensing instrument configured to sense the pressure fluctuations in the feed line, the sensing instrument comprising a sensor configured to sense vibrations of the vibrating element;
- an evaluator configured to determine whether the sensed pressure fluctuations correspond to one of the first characteristic or the second characteristic, and to generate a signal corresponding to the determination, the signal indicating whether the liquid is absent or present at the feed line outlet,
- wherein the first and second characteristics are different from each other, and at least one of the first and second characteristics is one wherein the pressure in the feed line changes within a time interval in which a level of the liquid remains unchanged.

5. The sensor device according to claim 4, further comprising:
- a stop, arranged to delimit a maximum deflection of the vibrating element.

6. A sensor device for detecting an absence or presence of a liquid at an outlet of a feed line, which serves for feeding a feed substance, the feed substance, when exiting from the outlet, having a pressure in the feed line, said pressure having a course over time with a first characteristic when liquid is absent at the outlet and a course over time with a second characteristic when liquid is present at the outlet, the sensor device comprising:
- a measurement chamber, which is subdivided into a first chamber connected to the feed line and a second chamber,
- a sensing instrument configured to sense pressure fluctuations in the feed line, the sensing instrument comprising a sensor arranged in the second chamber of the measurement chamber,
- an evaluator configured to determine whether the sensed pressure fluctuations correspond to one of the first characteristic or the second characteristic, and to generate a signal corresponding to the determination, the signal indicating whether the liquid is absent or present at the feed line outlet
- wherein the first and second characteristics are different from each other, and at least one of the first and second characteristics is one wherein the pressure in the feed line changes within a time interval in which a level of the liquid remains unchanged.

7. The sensor device according to claim 6, wherein the measurement chamber further comprises a vibrating element that separates the first and second chambers.

8. The sensor device according to claim 6, wherein the second chamber is sealed off from the first chamber.

9. A level switch for sensing a specific level of a liquid, comprising a sensor device according to claim 1.

10. A filter device for cleaning a liquid, comprising a sensor device according to claim 1.

11. A method for detecting an absence or presence of a liquid at an outlet of a feed line, the method comprising:
- feeding a feed substance to the outlet in such a way that a pressure of the feed substance in the feed line over an interval of time has a first characteristic when liquid is absent at the outlet, and has a second characteristic when liquid is present at the outlet;
- sensing and evaluating pressure fluctuations in the feed line, wherein said pressure fluctuations are determined to correspond to one of the first characteristic or the second characteristic; and
- generating a signal corresponding to the determination, the signal indicating whether the liquid is absent or present at the feed line outlet,
- wherein the first and second characteristics are different from each other, and at least one of the first and second characteristics is one wherein the pressure in the feed line changes within a time interval in which a level of the liquid remains unchanged.

12. The method according to claim 11, wherein at least one of an amplitude and a frequency of the pressure fluctuations are determined.

13. The method according to claim 11, wherein one of the first and second characteristics corresponds to a pressure that is substantially constant throughout the interval of time and the other characteristic corresponds to a pressure that is repeatedly rising and falling throughout the interval of time.

14. The method according to claim 11, wherein the feed substance is a gas or a liquid.

15. The method according to claim 11, wherein, for flushing purposes, feed substance is repeatedly fed at increased pressure through the outlet.

16. The method according to claim 11, in which a sensor device comprising a sensing instrument is provided that senses pressure fluctuations in the feed line, and an evaluator is provided that determines whether the sensed pressure fluctuations correspond to either the first characteristic or the second characteristic, and generates a signal corresponding to the determination, the signal indicating whether the liquid is absent or present at the feed line outlet.

* * * * *